Nov. 9, 1943.　　　F. HOLZKNECHT　　　2,333,651
SELF-SET ANIMAL TRAPS
Filed Dec. 2, 1941　　　2 Sheets-Sheet 1
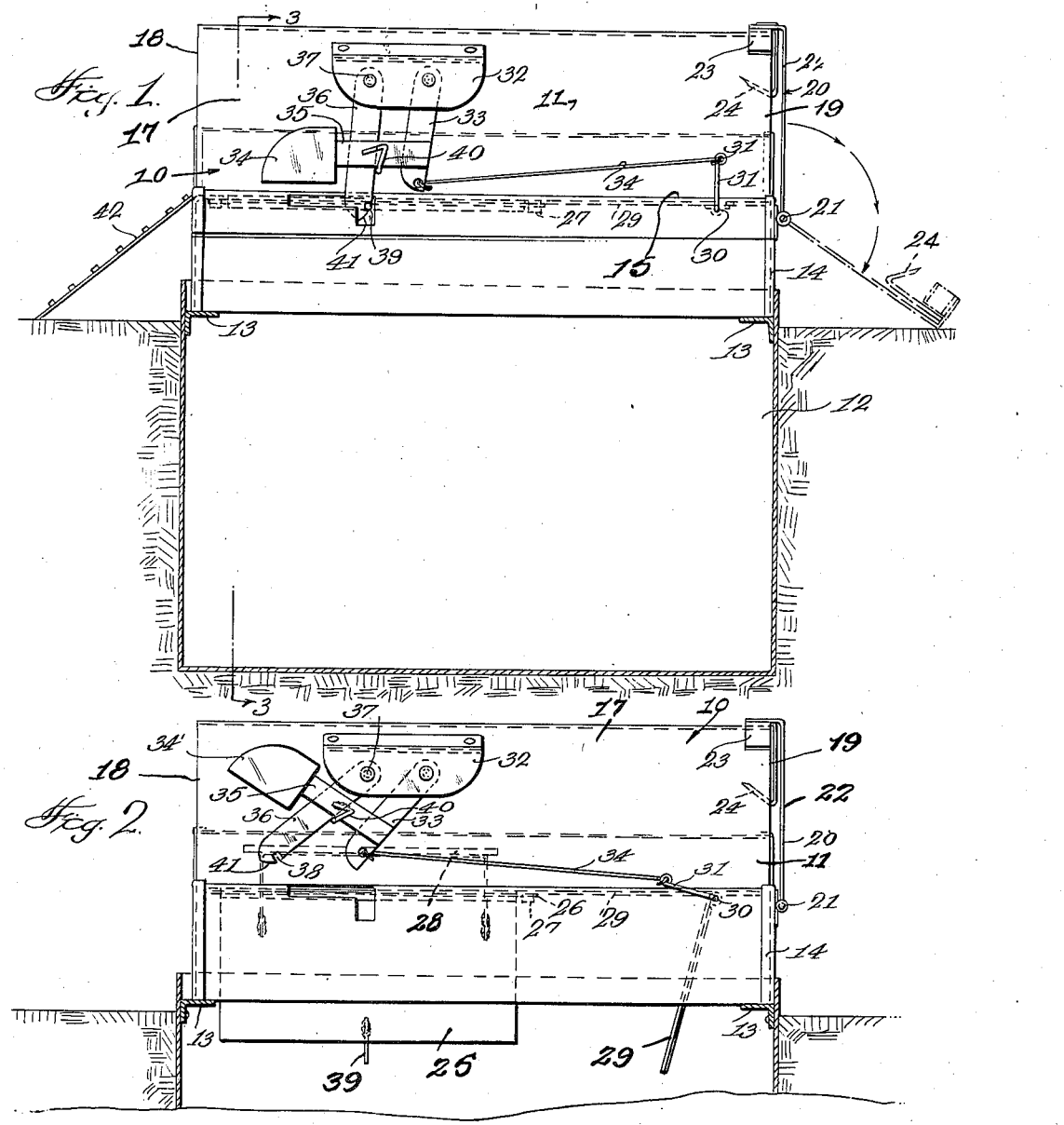
INVENTOR.
Felix Holzknecht Nov. 9, 1943.  F. HOLZKNECHT  2,333,651
SELF-SET ANIMAL TRAPS
Filed Dec. 2, 1941  2 Sheets-Sheet 2
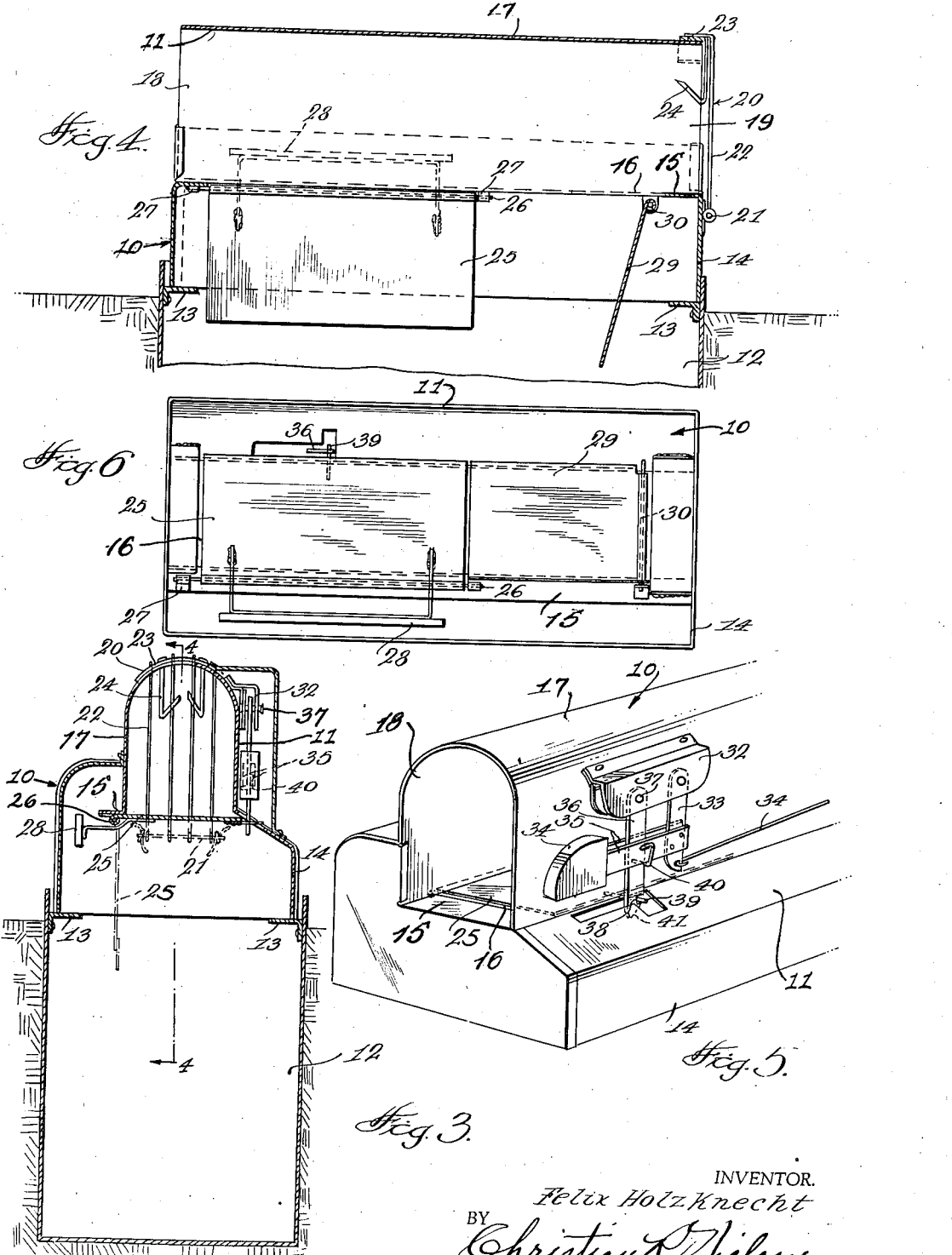
INVENTOR.
Felix Holzknecht
BY Christian R. Nielsen
ATTORNEY Patented Nov. 9, 1943

2,333,651

UNITED STATES PATENT OFFICE 2,333,651

SELF-SET ANIMAL TRAP

Felix Holzknecht, Vancouver, British Columbia, Canada

Application December 2, 1941, Serial No. 421,352

3 Claims. (Cl. 43—70)

This invention relates to animal traps and more particularly to that type known as the self-set traps and it consists in the constructions, arrangements and combinations herein described and claimed.

It is a particular object of the invention to provide a trap in which a pair of trap doors are involved, the innermost of which is operable for release of the first, under weight of an animal.

It is also an object of the invention to provide a novel release mechanism between the trap doors insuring quick and positive action eliminating all possibility of an animal clinging to the sides of the housing of the trap, and thus preventing resetting of the trap doors.

It is a still further object of the invention to provide a novel means insuring positive resetting and retention of the first trap door, even though the second trap door may have swung to its closed position.

A further object of the invention is the provision of a trap in which the operating parts are housed preventing liability of the parts being interfered with by foreign obstacles, as well as protecting the parts from weather, enabling the trap to be used outdoors when desired.

Additional objects, advantages and features of invention will be apparent from the following description considered in conjunction with the accompanying drawings, wherein, Figure 1 is a side elevation of the trap, with the cover for the operating part removed, showing the parts in set position, Figure 2 is a similar view showing the doors and release mechanism in open position, Figure 3 is a vertical cross section on the line 3—3 of Figure 1, Figure 4 is a longitudinal section on the line 4—4 of Figure 3, Figure 5 is a detail perspective view of the release mechanism and adjacent parts of the trap, Figure 6 is a bottom view of the trap.

There is illustrated a trap generally indicated by the reference character 10, consisting of a housing 11 constructed and adapted to be seated upon the upper open end of an enclosure 12.

The enclosure 12 may be formed from any suitable material, but sheet metal is preferred, the joints of which are water-tight for containing water for the purpose of drowning the animals which are trapped. Obviously where the animals are to be caught alive, the water would not be used, in which event, the animals would be merely dropped into the enclosure 12.

Below the upper edge of the enclosure, a flange 13 is formed adapted to receive the trap proper therewithin, and having a fit permitting the removal of the trap as will be required to empty the enclosure of the animals caught. The enclosure may be set in the ground, as shown, or not, as required in different uses.

The trap consists of a housing provided with a base 14 which rests upon the flange 13, the floor 15 of which is provided with an opening 16 extending substantially the full length of the trap as may be seen in Figure 4.

A tunnel passageway 17 is mounted upon the bottom wall 15 and extends from the front or entrance opening 18 to the rear end 19 of the housing, the rear end being closed by a hinged door 20.

The door 20 has a pintle 21 at its lower end upon which there are secured a plurality of bars 22 connected at their upper ends by a cap 23 adapted to frictionally engage upon the upper portion of the tunnel for maintaining the door in closed position. Bait hooks 24 are fixed to the cap and bent so as to extend inwardly of the tunnel. It will be obvious that the door may be swung upon its pintle to the open position shown by dotted lines in Fig. 1 for securement of any suitable bait to the hooks.

A trap door 25 is swingably mounted along one longitudinal edge by means of a pintle 26 mounted in eyes 27 fixed upon the lower face of the wall 15. The door 25 is of a length slightly greater than one-half the length of the opening 16 and of a width slightly less, so that the door may partake of free lateral swinging movements. A counter-weight 28 is mounted on the door outwardly of the hinge pintle 26 so as to hold the door normally closed, yet the door is free to swing to open position under weight of an animal. The door is held in set position by means presently to be described.

A second trap door 29 is mounted upon a pintle 30 extended transversely of the opening 16 and positioned adjacent of the bait door 20, the free end of the trap door 29 stopping short of the next adjacent edge of the first trap door 25. The pintle 30 is extended through a side wall of the housing and bent upwardly to form a crank lever 31.

A bracket 32 is mounted upon the outside of the wall of the tunnel, and has swingably mounted thereon a lever 33. A link 34 is connected between the crank lever 31 and the lever 33. As shown in Figure 2, when the trap door 29 is swung downwardly, the link 34 will swing the lever 33 in an upward direction, and in order that the trap door 29 will be moved back to normal set position, a counter-weight 34' is fixed to the lever 33. The counter-weight 34' is shown as carried upon a pair of spaced plates 35, between which a lever 36 is positioned, the upper end of the lever 36 being pivoted upon the bracket as at 37.

The lever 36 is provided with a notch 38 adjacent its lower end adapted to engage a pin 39 of the trap door 25, the latter holding the door against movement until released by the trap door 29. A small lug 40 is fixed across the plates 35 rearwardly of the lever 36, the lug functioning to move the lever 36 so as to release the pin 39 and the trap door 25, as will be described in the operation of the trap.

The end of the lever 36 immediately below the notch is slightly cammed, as at 41 so that in the event that the lever 36 should swing to normal position before the trap door 25 has returned to its initial position, the pin 39 will engage the cam 41 moving the lever 36 rearwardly and allowing the pin to pass into position for engaging the notch 38.

A ramp 42 is employed whereby animals may enter the tunnel 17, induced to enter by reason of the bait at the opposite end of the tunnel.

In use, the bait is fixed to the hooks 24 and the trap is then set in a runway of animals to be trapped. The animal will walk up the ramp and enter the tunnel 17 in an endeavor to secure the bait at the opposite end of the trap. It should be noted that the bait door is of a slotted or open work structure, allowing light to enter the tunnel, and will therefore not tend to instill fear in the animal, as would be the case where the tunnel is completely closed by a solid door.

The first trap door 25 will support the weight of the animal by reason of engagement of the pin 39 within the notch of the lever 36. The animal will continue forwardly in the direction of the bait until he encounters the second trap door 29. Immediately upon application of weight upon the second trap door, motion is imparted to the link 34 which in turn swings the lever 33 rearwardly, the lug 40 engaging the lever 36, moving it rearwardly and releasing the pin 39 of the trap door 25. The operation of the doors is instantaneous, and the animal is dropped into the enclosure. The doors 25 and 29 then swing under influence of the weights 28 and 34 respectively to their set positions in readiness for the next animal.

The trap is especially effective in catching mice and rats, but obviously, the trap may be constructed in different sizes and strengths for use in capturing larger animals.

While I have shown and specifically described the trap, this is by way of illustration only and I consider as my own all such modifications in structure as fairly fall within the scope of the appended claims.

I claim:

1. An animal trap comprising in combination: an enclosure, a tunnel passageway positioned above the enclosure and having an elongated opening in the base thereof, a hinged open-work door for closing one end of the tunnel passageway, bait supporting means on the door, ramp means leading to the other end of the tunnel passageway, a trap door longitudinally hinged within the opening of the base of the passageway, a trap door hinged transversely within the opening of the base of the passageway, the doors being positioned so as to have closely adjacent ends providing a substantially uninterrupted surface, counterweight means on the first door for holding the door in normal position, a pin fixed on the door, a crank lever on the other door positioned outwardly of the tunnel passageway, a pair of lever members pivotally mounted upon the exterior side of the tunnel passageway, a link connected between the crank lever and one of the lever members, a pair of spaced plates fixed to said lever and extending substantially longitudinally of the tunnel passageway, a counterweight fixed to the ends of the plates for maintaining the crank lever in a substantially vertical plane, said other lever member being extended downwardly between the plates and having a notch for reception of the pin of the first trap door, the lower end of the lever having a cam face for guidance of the pin into the notch at times, and a lug fixed to the plates for moving the last named lever for releasing the pin under opening movement of the second named door.

2. The structure of claim 1, in which a cover member encloses the crank, levers and associated counterweight.

3. An animal trap comprising in combination: an enclosure, a casing removably mounted upon the enclosure and having an open bottom, said casing being elongated and having open ends, an open-work door hingedly mounted at the base wall of one of the open ends of the casing and adapted to close said opening, said door having bait securing means at its upper free end, a trap door longitudinally hinged in the walls of the casing and disposed over a portion of the open bottom of the casing, a second trap door disposed within the remaining portion of the open bottom, said second trap door being transversely hinged for longitudinal swinging movement, detent means for maintaining one of the trap doors against movement, release means operable by the other trap door for actuating the detent means and counterweight means for returning the trap doors, detent and release means to normal position.

FELIX HOLZKNECHT.